United States Patent
Iswandhi et al.

(10) Patent No.: US 9,032,218 B2
(45) Date of Patent: May 12, 2015

(54) KEY ROTATION FOR ENCRYPTED STORAGE MEDIA USING A MIRRORED VOLUME REVIVE OPERATION

(75) Inventors: Geoffrey Ignatius Iswandhi, Sunnyvale, CA (US); Mihai Damian, Campbell, CA (US); Vijaykumar Immanuel, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1193 days.

(21) Appl. No.: 12/697,045

(22) Filed: Jan. 29, 2010

(65) Prior Publication Data

US 2011/0188651 A1    Aug. 4, 2011

(51) Int. Cl.
| | |
|---|---|
| *G06F 11/30* | (2006.01) |
| *G06F 13/00* | (2006.01) |
| *G06F 12/00* | (2006.01) |
| *G06F 12/14* | (2006.01) |
| *G06F 12/16* | (2006.01) |
| *H04L 9/14* | (2006.01) |

(52) U.S. Cl.
CPC .............. *G06F 12/00* (2013.01); *G06F 12/14* (2013.01); *G06F 12/16* (2013.01); *H04L 9/14* (2013.01)

(58) Field of Classification Search
USPC ......................................................... 713/189
See application file for complete search history.

(56) References Cited

U.S. PATENT DOCUMENTS

| | | | |
|---|---|---|---|
| 4,888,802 A | 12/1989 | Cooney | |
| 5,051,887 A | 9/1991 | Berger et al. | |
| 5,933,653 A | 8/1999 | Ofek | |
| 6,397,307 B2 | 5/2002 | Ohran | |
| 7,240,197 B1 | 7/2007 | Yamagami et al. | |
| 7,627,756 B2 | 12/2009 | Fujibayashi et al. | |
| 2005/0034013 A1* | 2/2005 | Yamamoto et al. | 714/6 |
| 2005/0102603 A1* | 5/2005 | Tapper et al. | 714/770 |
| 2006/0136732 A1 | 6/2006 | Vandermolen | |
| 2007/0079119 A1 | 4/2007 | Mattsson et al. | |
| 2007/0079140 A1 | 4/2007 | Metzger et al. | |
| 2008/0240434 A1* | 10/2008 | Kitamura | 380/255 |
| 2008/0260159 A1 | 10/2008 | Osaki | |
| 2009/0060201 A1 | 3/2009 | Rhodes et al. | |
| 2009/0196414 A1 | 8/2009 | Mittal et al. | |
| 2009/0199016 A1 | 8/2009 | Kishi | |
| 2011/0113259 A1* | 5/2011 | Bilodi et al. | 713/193 |

OTHER PUBLICATIONS (no stated author); RAID 1(+0): breaking mirrors and rebuilding drives; 2007; retrieved from the Internet <URL:nstor.ru/files/pdf/291966B21.pdf>; pp. 1-9 as printed.*

Ingrain Networks, Online Key Rotation with Ingrain, http://www.ingrian.com/resources/sol_briefs/Ingrian%20online%20key%20rotation.pdf, Jun. 4, 2007, 2 pages.

* cited by examiner

*Primary Examiner* — Michael Chao
(74) *Attorney, Agent, or Firm* — Hewlett-Packard Patent Department

(57) ABSTRACT

Encryption key rotation is performed in computing environments having mirrored volumes by initializing a target storage media with a new key, performing a mirror revive operation from a first storage media to the target storage media, and configuring the first storage media and the target storage media to comprise a mirrored volume.

8 Claims, 9 Drawing Sheets

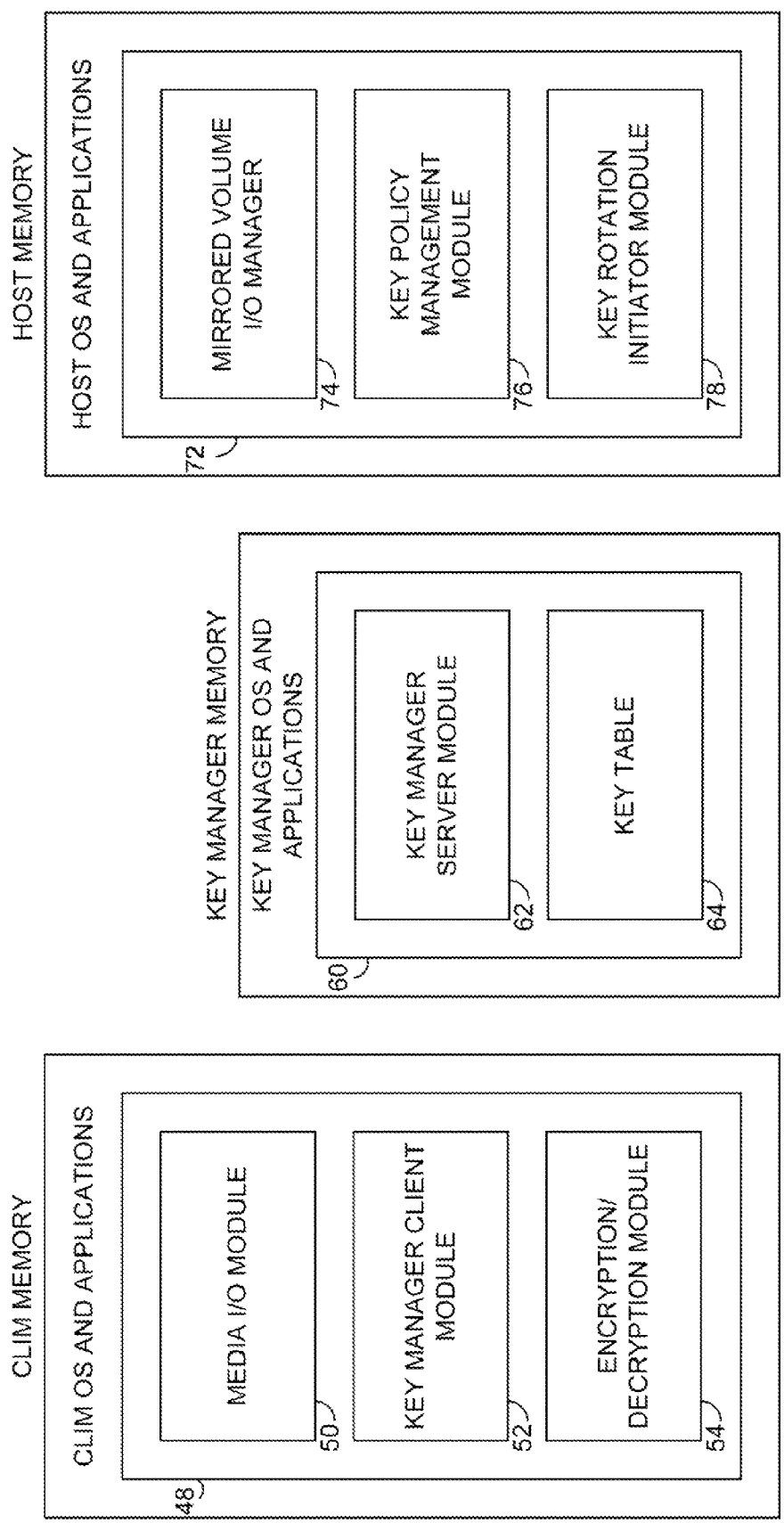

KEY ROTATION FOR ENCRYPTED STORAGE MEDIA USING A MIRRORED VOLUME REVIVE OPERATION

BACKGROUND

In the art of computing, it is desirable to encrypt data stored on persistent storage media, such as hard disk drives. Encryption protects the data from unauthorized access, and theft of the media upon which the data is stored.

Data is encrypted using encryption keys, and it is desirable to periodically rotate encryption keys. For data that is already encrypted, the key rotation process comprises reading data encrypted with the old encryption key from the storage media, decrypting the data using the old key, encrypting the data with the new key, and writing the data encrypted with the new key back to the storage media.

In the art of computing, it is also desirable to provide redundancy so that operation of a computer system can continue after the failure of a component. One method known in the art for providing storage media redundancy is to mirror the data. In a mirrored configuration, two storage devices are provided, and the same data is stored on each device. If one device fails, the data is still available on the other device.

BRIEF DESCRIPTION OF THE DRAWINGS

The Figures depict embodiments, examples, implementations, and configurations of the invention, and not the invention itself.

FIG. 4 shows memory associated with the cluster I/O manager, in accordance with examples of the present invention.

FIG. 5 shows memory associated with the key manager, in accordance with examples of the present invention.

FIG. 6 shows memory associated with the host, in accordance with examples of the present invention.

DETAILED DESCRIPTION

Figure 1:
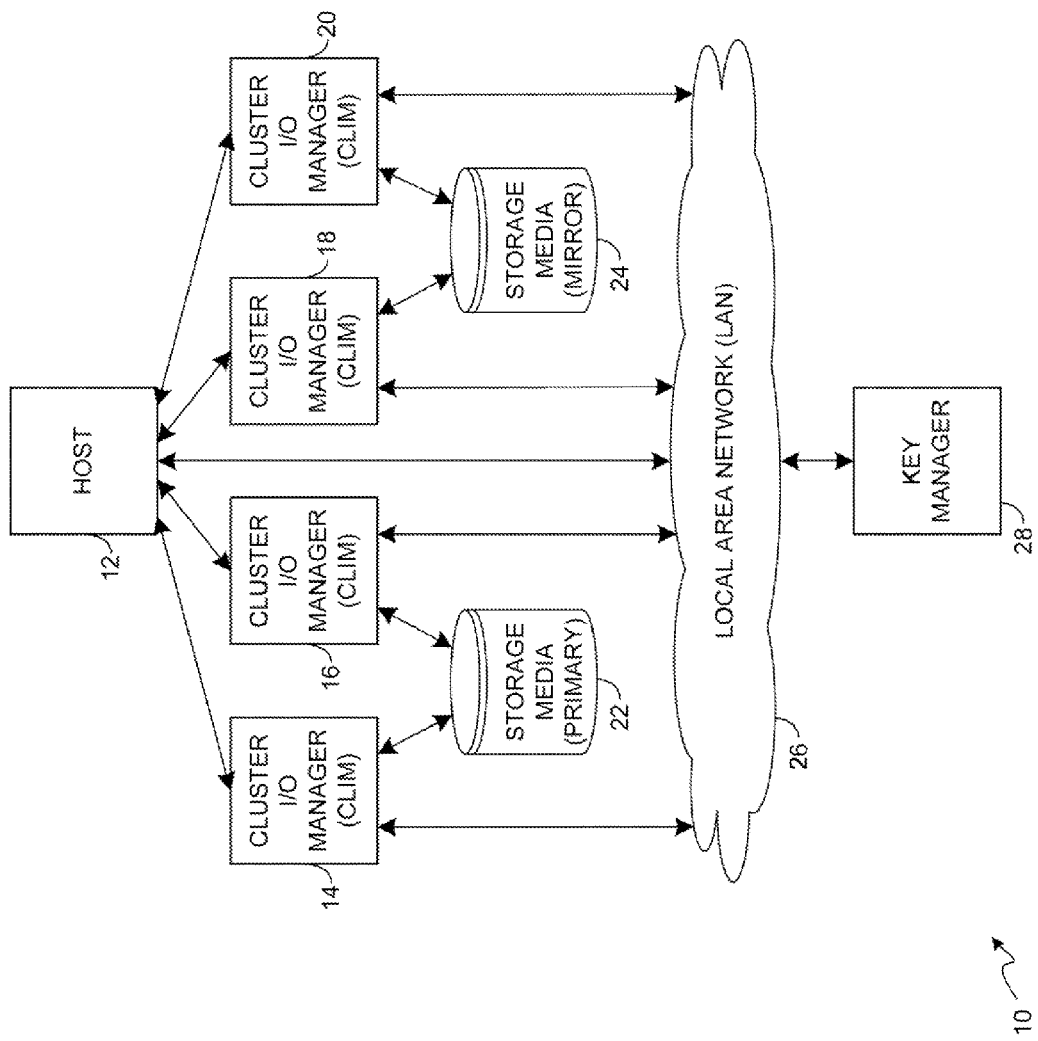
FIG. 1 is a block diagram of a computing environment in which examples of the present invention are deployed, in accordance with examples of the present invention.

In the foregoing description, numerous details are set forth to provide an understanding of the present invention. However, it will be understood by those skilled in the art that the present invention may be practiced without these details. While the invention has been disclosed with respect to a limited number of embodiments and examples, those skilled in the art will appreciate numerous modifications and variations therefrom. It is intended that the appended claims cover such modifications and variations as fall within the true spirit and scope of the invention.

Examples of the present invention perform key rotation in computer systems having mirrored storage devices. In accordance with examples of the invention, when key rotation is desired for a particular storage device, a storage device is reinitialized with a new key. At this point, for all intents and purposes, the storage device is empty. A mirrored volume revive operation is initiated, and the data on another storage device that comprises the mirrored volume is copied to the storage device that has been initialized with the new key. When the revive operation is complete, key rotation is complete, and the storage device encrypted with the new key joins the mirrored volume. Accordingly, examples of the present invention leverage procedures provided to support mirrored volumes to also perform key rotation.

The process of encryption transforms plaintext data into encrypted data using an encryption key. The process of decryption transforms encrypted data back into plaintext form using a decryption key. Encrypted data is secure because it cannot be decoded into plaintext form without the decryption key. As used herein, the term "key rotation" includes transforming plaintext data to encrypted data, transforming encrypted data to plaintext data, and transforming data encrypted with a first encryption key into data encrypted with a second encryption key.

There are two types of encryption, asymmetric and symmetric. Asymmetric encryption uses an encryption key to encrypt the data, and a different decryption key to decrypt the data. Encryption keys can be public so that anyone can encrypt the data, and the decryption keys can be kept private so that only the key holder can decrypt the data. RSA encryption is an example of asymmetric encryption. Asymmetric encryption is especially useful for communication between remote entities or devices, since each entity or device does not need to know the secret key of the other entity or device. For example, secure communication between devices coupled by the Internet is typically performed using asymmetric communication.

Symmetric encryption uses the same key for both encryption and decryption. The key is kept secret. Blowfish, Defense Encryption Standard (DES), triple DES, and Advanced Encryption Standard (AES) are typical examples of symmetric encryption. Symmetric encryption is well suited for applications having large amounts of data accessed by the same device or entity since the device or entity can keep the key secret.

The algorithms used in symmetric encryption are bidirectional. Decryption is the reverse process of encryption. Symmetric block-level encryption, sometimes referred to as a block cipher, divides the data to be encrypted into blocks or groups of characters, and the encryption algorithm is applied to each block. Key length varies according to the cipher, with DES having 56-bit keys, and AES having 128-bit, 192-bit, or 256-bit keys. IEEE Standard 1619 provides for cryptographic protection of data on block-oriented storage devices, such as disk drives, flash memory, optical drives, and the like.

The discussion below assumes that symmetric encryption will be used when describing examples of the present invention. Accordingly, the terms "key" and "encryption key" are used interchangeably when referring to encryption and decryption processes. However, those skilled in the art will recognize that asymmetric encryption may be used with examples of the present invention. If asymmetric encryption is used, than a different decryption key is used to perform decryption operations.

FIG. 1 is a block diagram of a computing environment 10 in which examples of the present invention are deployed. Environment 10 includes host 12, cluster I/O managers (CLIMs) 14, 16, 18, 20, storage media 22 and 24, local area network (LAN) 26, and key manager 28. CLIMs 14, 16, 18, and 20 are coupled to host 12. Typically, the host and CLIMs will be coupled by a high speed fabric, such as InfiniBand or ServerNet switched fabrics, or Fibre Channel, iSCSI, or SCSI connections. ServerNet switched fabrics are used in NonStop computing environments provided by Hewlett-Packard Company. Of course, other connection fabrics may be used, such as PCI and PCIe connections, Ethernet connections, USB connections, Firewire connections, and the like. The connections between the CLIMs and the storage media will typically be connections used to connect disk drives to controllers, such as IDE, SATA, SAS, Fibre Channel (FC) or SCSI connections. Of course, other connections may also be used. Host 12, CLIMs 14, 16, 18, 20, and key manager 28 are all coupled to LAN 26.

Only connections and devices needed to understand examples of the present invention are shown in FIG. 1. Of course, in a typical configuration, other connections and devices will be present. For example, other service and management processors may be provided, and additional redundant connections may be provided.

During normal operation, storage media 22 is a primary storage device, and storage media 24 mirrors the data stored on storage media 22. In general, write operations must be performed to both storage devices, but read operations need only be serviced from one of the storage devices. Typically, the storage device that services read operations is the primary storage device, and the other storage device is the mirror storage device. However, the primary and mirror storage devices may service different read operations simultaneously to allow for load balancing.

Also note that each storage media is coupled to two CLIMs. Typically, the path between one CLIM and a storage device will be designated as an active path that will carry all I/O requests during normal operation, and the path between the other CLIM and the storage device will be designated as a backup path that will only carry I/O requests in the event that the active path fails.

Host 12 is responsible for managing the mirrored volume, and is responsible for sending data to be written to the mirrored volume to both storage media 22 and 24. CLIMs 14, 16, 18, and 20 are responsible for encrypting and decrypting data blocks as the data blocks are written to and read from storage media 22 and 24.

The encryption keys themselves are not stored on storage media 22 and 24. However, a key name is stored on each storage media. When the CLIMs are initialized, the CLIMs retrieve the key name from the storage media and provide the key name to key manager 28. Key manager 28, in turn, provides the encryption key to the CLIMs, which use the encryption key to access the data on the storage media. Although not shown in FIG. 1, it may be desirable to provide a redundant key manager to provide keys to CLIMs 14, 16, 18, and 20 in the event that key manager 28 fails.

For the purposes of understanding examples of the present invention, host 12, CLIMs 14, 16, 18, and 20, and key manager 28 can all be viewed as general purpose computers. Of course, in an actual deployment, the host, CLIMs, and key manager will have different capabilities. For example, host 12 may have a greater number of faster CPUs and significantly more memory than CLIMs 14, 16, 18, and 20, and key manager 28.

Figure 2:
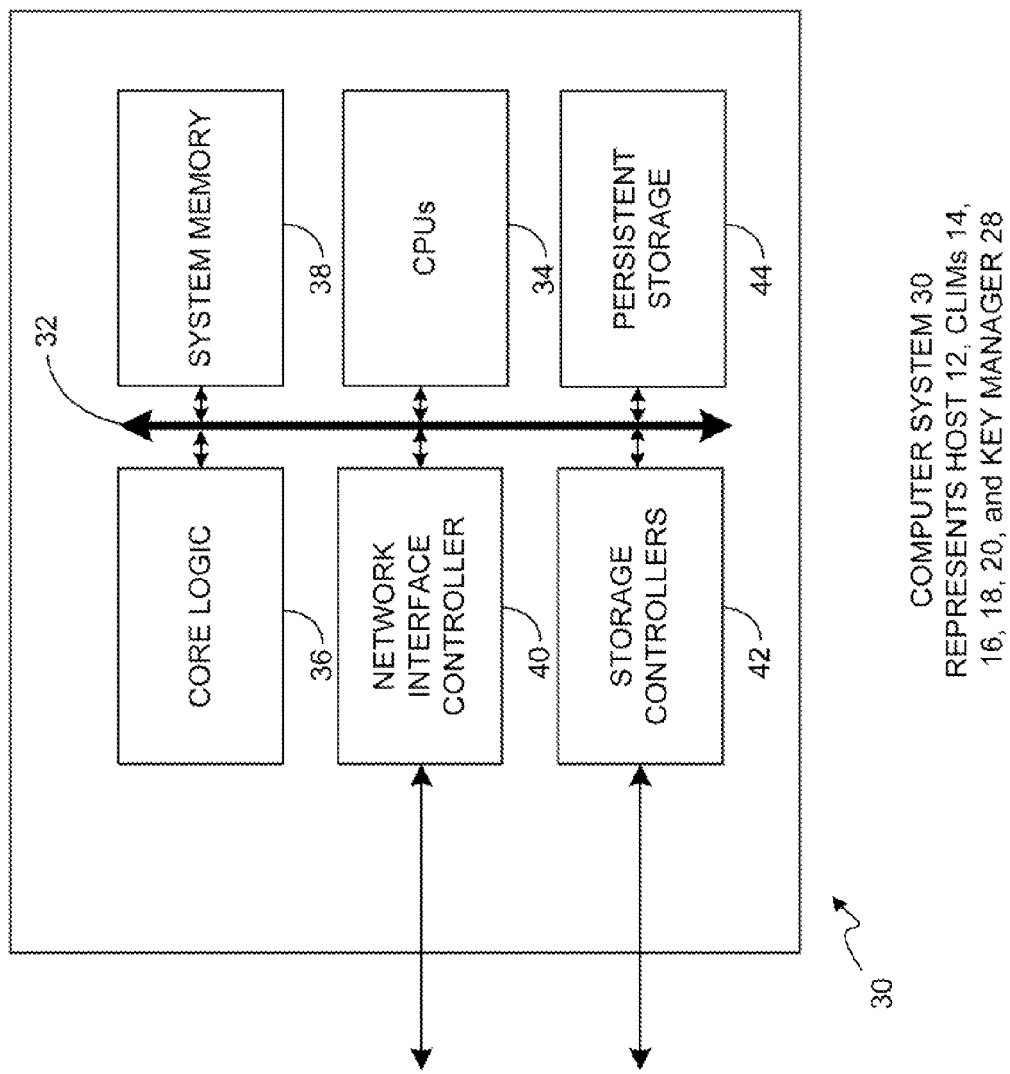
FIG. 2 shows a computer system that represents, in basic form, a host, cluster I/O managers, and a key manager, each of which is shown in FIG. 1, in accordance with examples of the present invention.

FIG. 2 shows a computer system 30 that represents, in basic form, host 12, CLIMs 14, 16, 18, and 20, and key manager 28. Computer system 30 includes a bus 32. Coupled to bus 32 are one or more CPUs 34, core logic 36, system memory 38, network interface controller 40, storage controllers 42, and persistent storage 44.

Although bus 32 is shown generically as a single bus, those skilled in the art will recognize that typically a variety of busses and fabrics are used to connect the components shown in FIG. 2. CPUs 34 may represent a single CPU, multiple CPUs in individual integrated circuit (IC) packages, multiple CPU cores in a discrete IC package, or any combination of these elements. Core logic 36 represents the core logic that couples CPUs 34, system memory 38, network interface controller 40, storage controllers 42, and persistent storage 44. In some architectures, core logic 36 includes a Northbridge and a Southbridge. However, other architectures are known in the art. For example, in some architectures, the memory controller is provided in the CPU.

For the purposes of describing examples of the present invention, core logic 36 also includes other components found in a typical computer system, such as firmware and I/O components, disk controllers for local persistent storage, USB ports, video controllers, and the like. In a server, some of these components may not be utilized. Persistent storage 44 represents storage used to store local copies of the operating system, applications, and other programs and data. Persistent storage 44 may represent devices such as hard disk drives, solid state drives, tape drives, optical drives, and the like. Alternatively, persistent storage may be provided external to computer 30. Network interface controller connects computer 30 to a network, such as LAN 26 in FIG. 1.

For host 12, storage controllers 42 represent the controllers that interface to the fabric coupling host 10 to the CLIMs 14, 16, 18, and 20. Examples of such fabrics are discussed above. For CLIMs 14, 16, 18, and 20, storage controllers 42 represent the controllers that couple the CLIMs to storage media 22 and 24. Examples of such connections are discussed above. In some configurations, these interfaces may be provided as part of core logic 36. Also note that key manager 28 may not require a storage controller 42 to access storage that is external to key manager 28.

Figure 3:
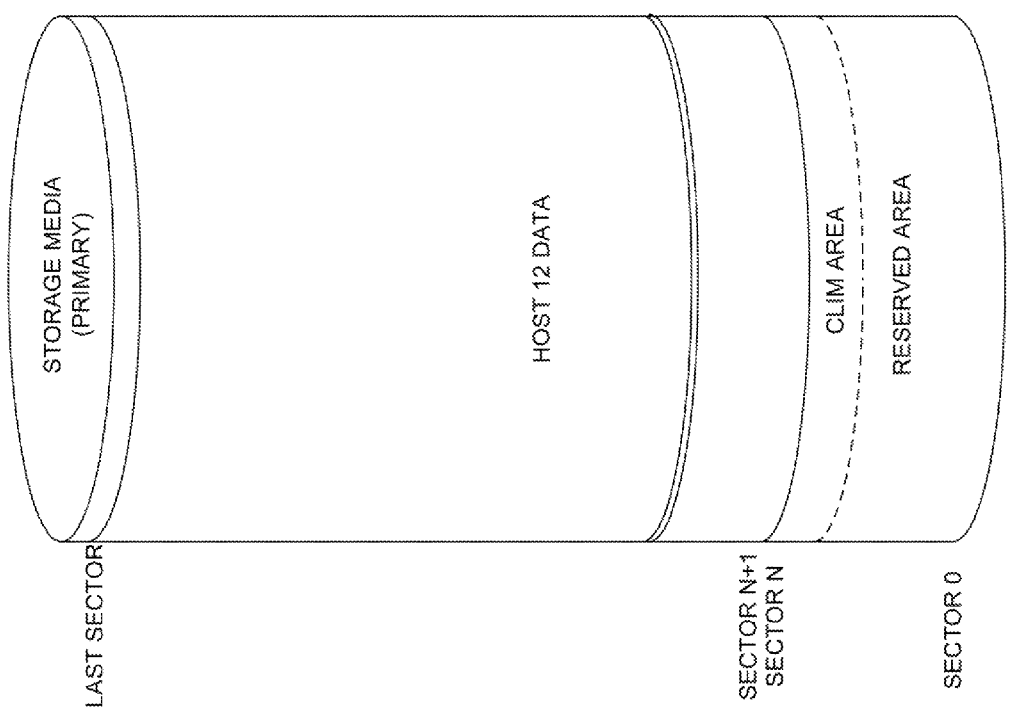
FIG. 3 is a block diagram of storage media shown in FIG. 1, in accordance with examples of the present invention.

FIG. 3 is a block diagram of storage media 22 of FIG. 1. A block diagram of storage media 24 would be substantially the same. Space on the media is identified by sectors from sector 0 to the last sector. A typical sector size is 512 bytes, but those skilled in the art will recognize that other sector sizes, such as 4096 bytes, may be used.

Sectors 0-N are reserved for system information, such as the media volume, and other information that identifies the media. Within this reserved area is an area reserved for the CLIMs to store information, such as data indicating whether or not the media is encrypted, the key name, and an algorithm identifier that identifies the encryption algorithm. The key itself is not stored on the media. The key is stored in key manager 28, and the key name is used to identify the key. Typically, the CLIM area will not be encrypted so that a CLIM may retrieve the key name to provide to key manager 28.

FIG. 4 shows CLIM memory 46, and the modules that operate the CLIMs. With reference to FIG. 2, if computer system 30 represents one of the CLIMs, the contents of CLIM memory 46 may exist at any point in time, in whole or in part, in system memory 38, persistent storage 44, and cache memories of CPUs 34 and core logic 36. Furthermore, code and data implementing the modules may be duplicated in the various components mentioned above.

CLIM memory 46 includes CLIM OS and applications 48. Within CLIM OS and applications 48 are media I/O module 50, key manager client module 52, and encryption/decryption client module 54.

Media I/O module 50 manages I/O between host 12 and storage media 22 or 24. Key manager client module 52 communicates with key manager 28. Key manager client module 52 provides a key name from storage media 22 or 24 to key manager 28, and key manager 28 returns the encryption key used to encrypt and decrypt data stored on storage media 22 or 24.

Encryption/decryption module 54 cooperates with key manager client module 52 to receive the encryption key. In cooperation with media I/O module 50, encryption/decryption module 54 encrypts data blocks being written to storage media 22 or 24, and decrypts data blocks being read from storage media 22 or 24.

FIG. 5 shows key manager memory 58, and the modules that operate key manager 28. With reference to FIG. 2, if computer system 30 represents key manager 28, the contents of key manager memory 58 may exist at any point in time, in whole or in part, in system memory 38, persistent storage 44, and cache memories of CPUs 34 and core logic 36. Furthermore, code and data implementing the modules may be duplicated in the various components mentioned above.

Key manager memory 58 includes key manager OS and applications 60. Within key manager OS and applications 60 are key manager server module 62 and key table 64. Key manager server module 62 communicates with key manager client module 52. Encryption keys and key names are stored in key table 64. When a CLIM needs to receive an encryption key for the storage media attached to the CLIM, key manager client module 52 sends the key name to key manager server module 62, which in turn retrieves the key from key table 64 using the key name, and transmits the key to key manager module 52. Communication between key manager server module 62 and key manager client module 52 may occur over a secure channel, such as a channel using Hypertext Transfer Protocol Secure (HTTPS), or channels secured by Transport Layer Security (TLS) or Secure Sockets Layer (SSL).

FIG. 6 shows host memory 70, and includes the modules that operate host 12. With reference to FIG. 2, if computer system 30 represents host 12, the contents of host memory 70 may exist at any point in time, in whole or in part, in system memory 38, persistent storage 44, and cache memories of CPUs 34 and core logic 36. Furthermore, code and data implementing the modules may be duplicated in the various components mentioned above.

Host memory 70 includes host and OS applications 72. Within host and OS applications 72 are mirrored volume I/O manager 74, key policy management module 76, and key rotation initiator module 78.

Mirrored volume I/O manager 74 manages media I/O transfers such that each read operation stores data on primary storage media 22, with the data mirrored at storage media 24. Mirrored volume I/O manager 74 also implements a mirror revive function. Should one of the storage media devices that comprise the mirror fail, the failed storage media device can be replaced, and a revive operation copies all data from the other mirrored storage device to the new storage device to restore the mirrored volume to mirrored operation. During the mirror revive operation, the storage device having a complete copy of the data is the revive source, and the new storage media that replaced the failed storage media is the revive target.

During the mirror revive operation, I/O requests continue to be serviced. Read requests may be serviced from the revive source. If the data block referenced in the read request has already been copied as part of the mirror revive, the read request could also be serviced by the revive target. Write requests from the host are written to the revive source. If the data block referenced in the write request has not been copied to the revive target, the data block need only be written to the revive source, and the block will later be copied to the target. On the other hand, if the data block that is referenced by the write request has already been copied to the target, the data block contained in the write request is also written to the target to ensure the integrity of the mirrored volume upon revive completion.

Figure 7:
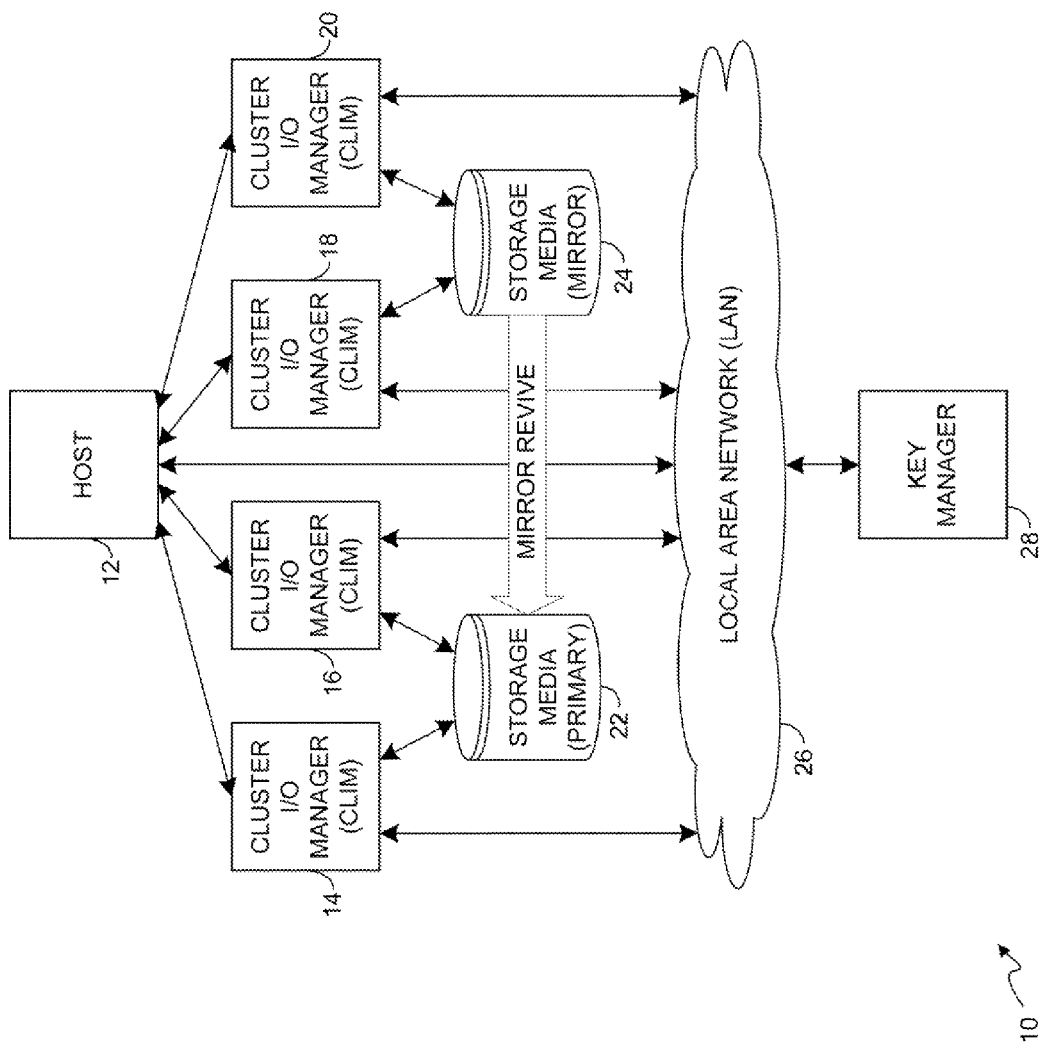
FIG. 7 shows the computing environment of FIG. 1 during key rotation, in accordance with examples of the present invention.

FIG. 7 shows computing environment 10 of FIG. 1 during key rotation. Key rotation may be launched manually by a system administrator, or via an automated process from key policy management module 76 of host 12. Whether launched manually or automatically, key rotation initiator module 78 of host 12 will be signaled to initiate key rotation. In the example discussed below, key rotation will be performed upon storage media 22. However, key rotation may be performed on storage media 24 using the same process.

When key rotation is initiated, key rotation initiator module 78 signals CLIMs 14 and 16 to initialize storage media 22 with a new key. Accordingly, key manager 28 provides a new key and key name to CLIMs 14 and 16, and the new key and key name are stored in key table 64 of key manager 28.

At this point, storage media 22, for all intents and purposes, has been cleared of all data. While the data still exists on storage media 22 encrypted with the old key, the data is no longer accessible because CLIMs 14 and 16 are now accessing storage media 22 with the new key.

Key rotation initiator module 78 signals mirrored volume I/O manager 74 to initiate a mirror revive operation to restore data from storage media 24, as shown in FIG. 7. The data flows from storage media 24 (the revive source), through either CLIM 18 or 20, through host 12, through either CLIM 14 or 16, to storage media 22 (the revive target). As CLIM 14 or 16 writes data to storage media 22, the data is encrypted with the new key.

When the mirror revive operation is complete, key rotation is complete for storage media 22. Storage media 22 may now be returned to normal operation and participate in the mirrored volume with storage media 24. If key rotation is desired for storage media 24, the steps described above can be repeated for media 24, with storage media 24 being initialized with a new key, and a mirror revive operation being performed from storage media 22 to storage media 24.

Note that the revive operation can copy every block from storage media 24 to storage media 22. However, it is also possible to optimize the revive operation to reduce the amount of data that needs to be transferred. Using one optimization technique, a data block map is used to identify the data blocks that are in use, and only the data blocks in use need to be copied from storage media 24 to storage media 22. Using another optimization technique, a "high water mark" may be used, with all data blocks that are in use existing below the high water mark, and no data blocks in use existing above the high water mark. Using this technique, data blocks are copied from the beginning of host 12 data (sector N+1 in FIG. 3) up to the high water mark, and data blocks above the high water mark are not copied.

Since storage media 24 continues to service I/O requests from host 12 during the revive operation, data block usage must be tracked using both optimization techniques because host 12 may write to a data block that was previously unused. Tracking data block usage when using the data block map optimization method tends to be complex because each unused block needs to be tracked. On the other hand, tracking disk block usage when using the high water mark optimization technique tends to be simpler since host 12 only has to compare write operations to the high water mark. If a write operation writes to a data block above the high water mark, the high water mark is simply reset to the location of the data block. The high water mark optimization technique can be further optimized by performing media storage defragmentation before key rotation to compact all used data blocks toward the beginning of the data area used by host 12, thereby lowering the high water mark.

Figure 9:
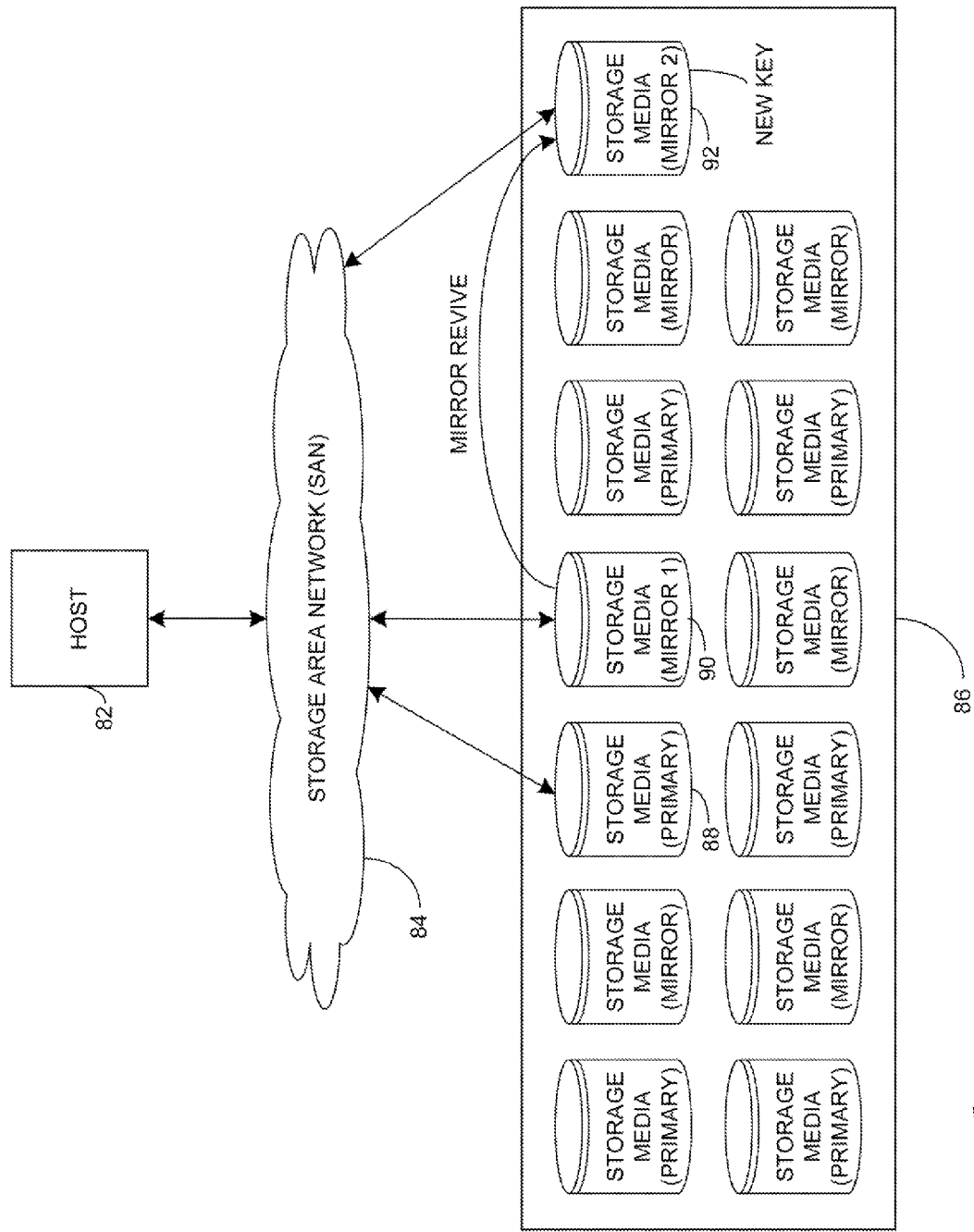
Figure 10:
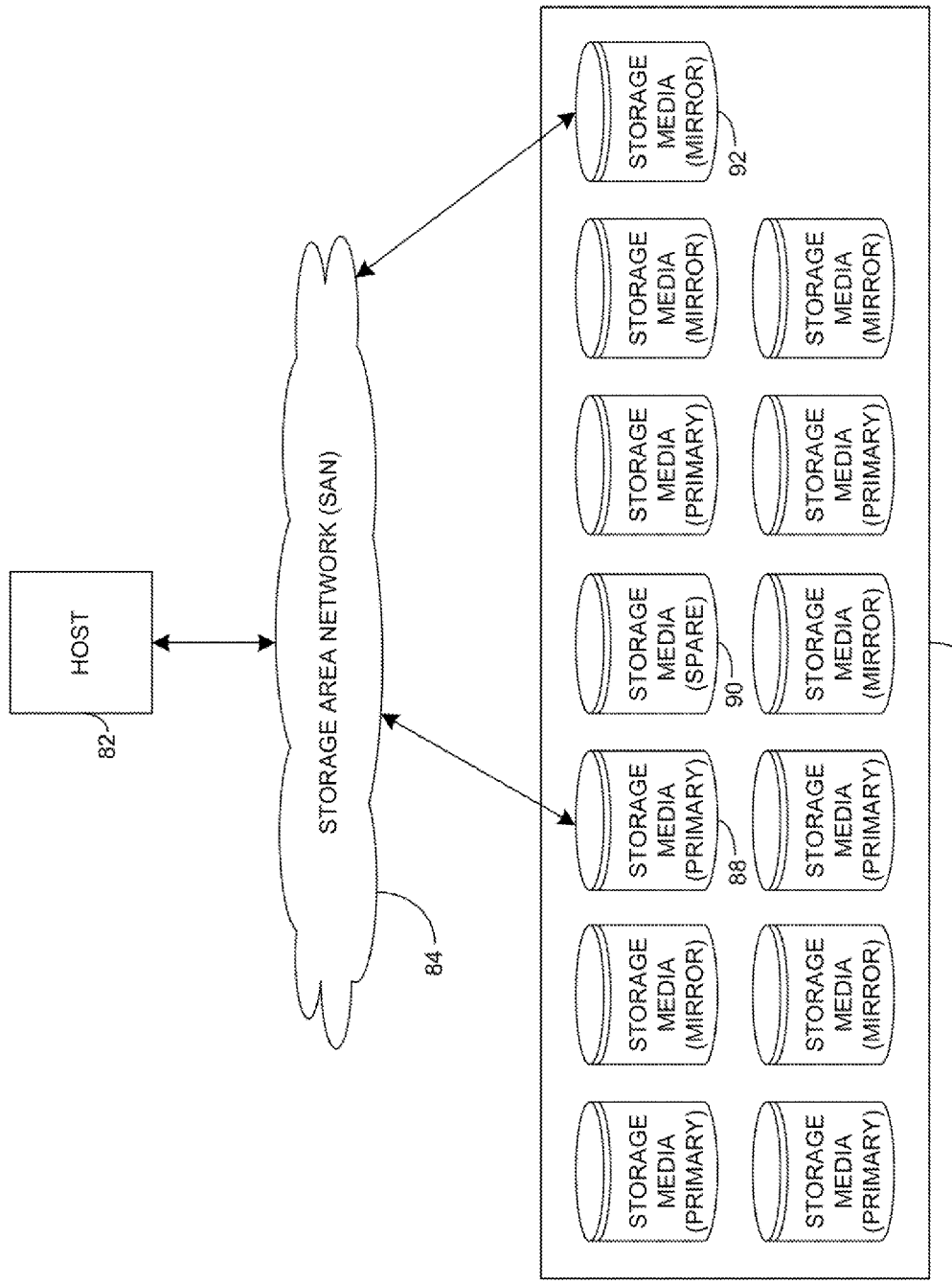

In the example discussed above, the redundancy normally provided by the mirrored volume is not available during key rotation. Since key rotation is provided by a mirror revive operation from storage media 24 to storage media 22, only storage media 24 has a complete copy of the data stored by host 12 until key rotation is complete. The examples of the present invention shown in FIGS. 8, 9, and 10 provide mirrored volume operation during the key rotation process.

Figure 8:
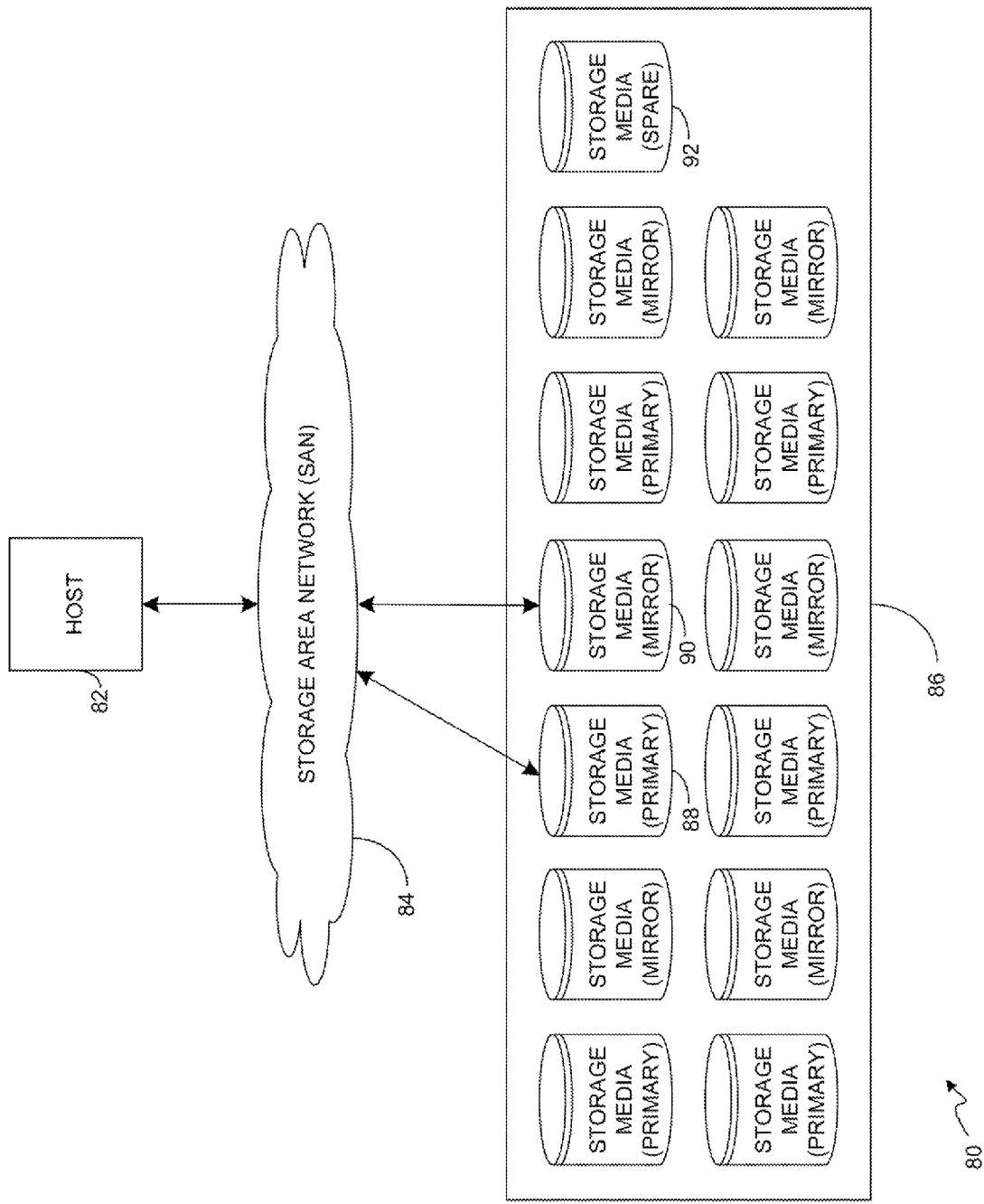
FIGS. 8, 9, and 10 are block diagrams of a computing system in which mirrored redundancy is maintained during the key rotation process, in accordance with examples of the present invention.

FIG. 8 shows computing environment 80. Environment 80 includes host 82, storage area network (SAN) 84, and storage media bank 86. For simplicity, the CLIMs are not shown in FIGS. 8, 9, and 10.

Storage media bank 86 has multiple storage media devices. Typically, such a bank of storage media devices will be provided in a storage device rack. Any of the storage media devices can be allocated to host 82 via SAN 84, or to other hosts not shown in FIGS. 8, 9, and 10.

Within storage media bank 86, storage media 88 is connected to host 82 via SAN 84 and is configured as a primary device in a mirrored volume. Storage media 90 is similarly connected and configured as a mirror. Also note that storage device 92 is not connected to a host and is allocated as a spare. The reminder of the storage devices are configured as mirrored volumes, and may be coupled to host 82, or other hosts not shown in FIGS. 8, 9, and 10.

In accordance with examples of the present invention, FIG. 9 is a block diagram of computing environment 80 of FIG. 8 in which a mirror revive operation is used to perform key rotation, while also maintaining complete redundancy of the mirrored volume. In FIG. 9, storage media 92 is initialized with a new key as discussed with reference to FIG. 7. Storage device 92 is coupled to host 82 via SAN 84, and is configured as a second mirror so that the mirrored volume comprises storage device 88 as the primary, storage device 90 as mirror 1, and storage device 92 as mirror 2.

In FIG. 9, storage media 90 is encrypted with an old key, and key rotation is desired for the data stored on storage media 90. Accordingly, a mirror revive operation is initiated from storage media 90 (the revive source) to storage media 92 (the spare being used as the revive target), with the data flowing from storage media 90, through SAN 84 to host 82, and from host 82 back through SAN 84 to storage media 92. During key rotation, the volume remains completely mirrored because complete copies of the data used by host 82 reside intact on storage media 88 and 90. Read requests from the mirrored volume can preferentially be serviced via storage media 88, which will have greater bandwidth since it is not participating in the mirrored revive operation. Write requests to the mirrored volume are performed to both storage media 88 and 90. If the data block being written to storage media 90 has not yet been copied to storage media 92, the data block only needs to be written to storage media 88 and 90, and will be later copied to storage media 92 from storage media 90 via the mirror revive operation. If the data block has been copied to storage media 92, then the data block is also written to storage media 92 as part of servicing the write request to ensure integrity of the mirrored volume after key rotation has been completed. Note that host 82 may throttle the mirror revive operation to provide full bandwidth to applications executing on host 82.

FIG. 10 shows computing environment 80 after key rotation is complete, and storage media 90 has been disconnected from host 82 and reallocated as a spare. Storage media 88 and storage media 92 now comprise the mirrored volume. If key rotation is also desired for the data stored on storage media 88, the key rotation method described above can be used to rotate the key by initializing storage media 90 with a new key, and performing a mirror revive operation from either storage media 88 or storage media 92 to storage media 90. When the mirror revive operation is complete, storage media 90 can be designated as the new primary, and storage media 88 can be designated as a spare. The other storage media devices in storage media bank 86 may also undergo key rotation one at a time, with the storage media device designated as the spare rotating through the storage media devices of storage media bank 86 as storage media devices undergo key rotation.

The examples of the invention described above provide many advantages. Mirrored volumes have been known in the art for a considerable period of time, and the various functions and I/O routines associated with maintaining mirrored volumes are stable and mature. Examples of the present invention leverage these functions and I/O routines to provide key rotation, thereby reducing the amount of time that it takes engineers and programmers to implement examples of the present invention. The volume continues to service I/O requests from the host during key rotation, and with the examples shown in FIGS. 8, 9, and 10, full mirrored redundancy is provided during key rotation.

Figure 11:
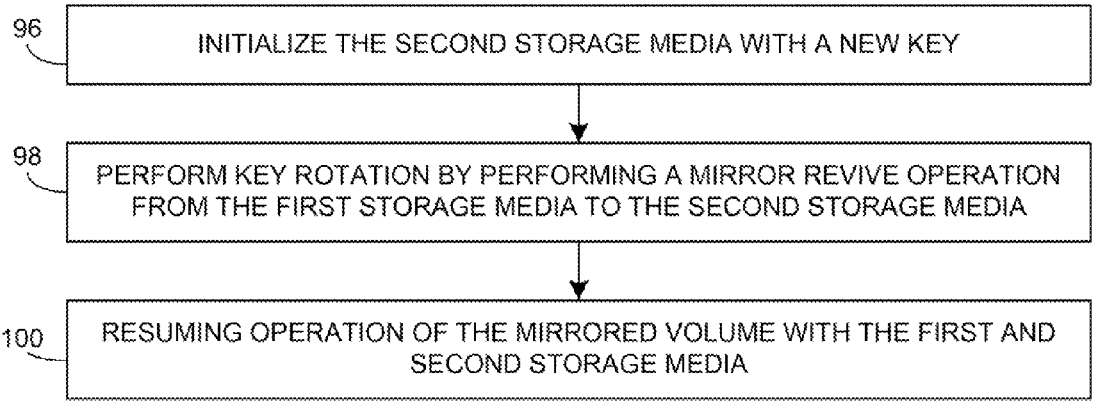
FIGS. 11 and 12 show flowcharts that illustrate methods in accordance with examples of the present invention.
Figure 12:
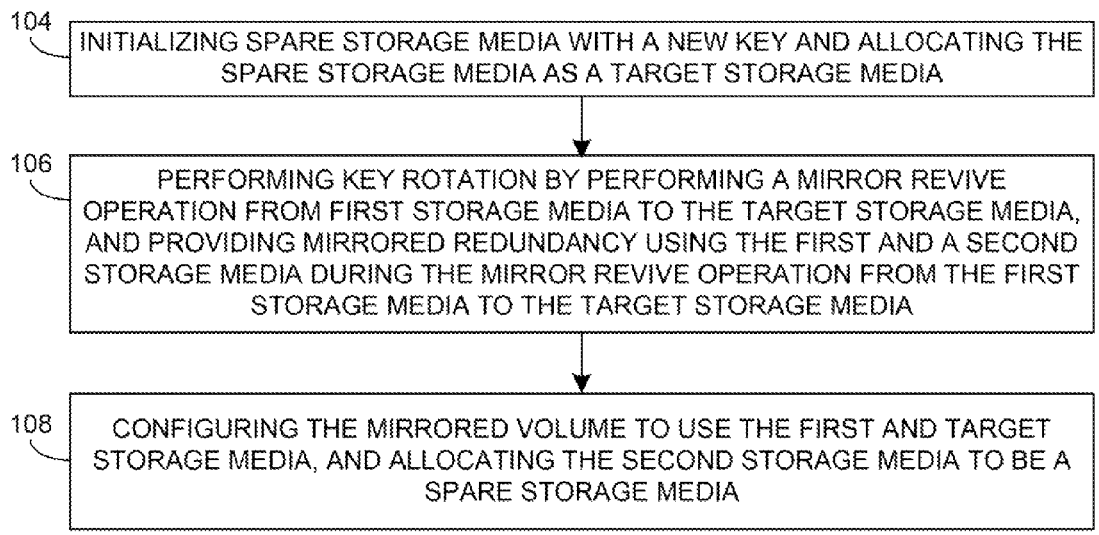

FIGS. 11 and 12 show flowcharts that illustrate methods in accordance with examples of the present invention. The flowcharts are merely representative and simplified compared to an actual implementation. Those skilled in the art will recognize that the blocks shown in the flowcharts will typically be implemented by many execution threads operating simultaneously.

Flowchart 94 of FIG. 11 represents the method of performing key rotation of a storage device in a mirrored volume, as depicted in FIG. 7. The method begins at block 80, where a second storage media of the mirrored volume is initialized with a new key. Control passes to block 98.

At block 98, key rotation is performed by performing a mirror revive operation from the first storage media to the second storage media. Control passes to block 100. At block 100, normal redundant operation of the mirrored volume resumes with the first and second storage media comprising the mirrored volume.

Flowchart 102 of FIG. 12 represents the method of performing key rotation of a storage device in a mirrored volume using a spare storage device, as depicted in FIGS. 8, 9, and 10. Flowchart 102 starts at block 104, where the spare storage media is initialized with a new key and the spare is allocated as target storage media. Control passes to block 106.

At block 106, key rotation is performed by performing a mirror revive operation from the first storage media to the target storage media. While the mirror revive operation is underway, full mirrored redundancy continues to be provided using the first and a second storage media. Control passes to block 108. At block 108, the mirrored volume is configured to use the first and target storage media, and the second storage media is allocated to be spare storage media.

In the foregoing description, numerous details are set forth to provide an understanding of the present invention. However, it will be understood by those skilled in the art that the present invention may be practiced without these details. While the invention has been disclosed with respect to a limited number of examples and embodiments, those skilled in the art will appreciate numerous modifications and variations therefrom. It is intended that the appended claims cover such modifications and variations as fall within the true spirit and scope of the invention.

What is claimed is:

1. A method of performing key rotation in a computing environment having a host coupled to a first and a second storage media, wherein the first and second storage media are in a mirrored volume configuration and wherein the first storage media is configured as a first mirror storage media and the second storage media is configured as a primary storage media, the method comprising:
   utilizing a processor to execute instructions stored on a non-transitory readable media for:
      initializing a target storage media with a new key;
      coupling the target storage media to the host and configuring the target storage media as a second mirror storage media;
      performing a mirror revive operation from the first storage media to the target storage media to perform key rotation, wherein the second storage media provides service requests to the host during the mirror revive, and wherein the mirror revive operation is optimized using one or more of a data block map optimization or a high water mark optimization;
      configuring the second storage media as a new primary storage media and configuring the target storage media as a new mirror storage media to comprise the mirrored volume; and
      configuring the first storage media as a new spare storage media and uncoupling the first storage media from the host, wherein the new spare storage media includes at least data stored in the first storage media.

2. The method of claim 1 wherein initializing the target storage media with the new key comprises accessing a key manager to obtain the new key.

3. Non-transitory readable media having computer executable program segments stored thereon, the computer executable program segments comprising:
   a mirrored volume I/O manager for maintaining a mirrored volume on a plurality of storage media; and
   a key rotation initiator module for:
      initializing a target storage media of the plurality of storage media with a new key;
      coupling the target storage media to a host and configuring the target storage as a second mirror storage media;
      performing a mirror revive operation from a first storage media of the plurality of storage media to the target storage media to perform key rotation, wherein the first storage media is in a mirrored volume with a second storage media of the plurality of storage media and wherein the second storage media provides service requests to the host during the mirror revive, and wherein the mirror revive operation is optimized using one or more of a data block map optimization or a high water mark optimization;
      configuring the second storage media as a new primary storage media and configuring the target storage media as a new mirror storage media to comprise the mirrored volume; and
      configuring the first storage media as a new spare storage media and uncoupling the first storage media from the host, wherein the new spare storage media includes at least data stored in the first storage media.

4. The non-transitory readable media of claim 3 wherein the first and target storage media comprise the mirrored volume before the mirror revive operation.

5. A computing environment comprising:
   a plurality storage media that includes a first storage media configured as a first mirror storage media and a second storage media configured as a primary storage media in a mirrored volume;
   a storage area network coupled to storage media of the plurality of storage media;
   a host coupled to the storage area network, the host including memory which includes:
   a mirrored volume I/O manager that maintains a mirrored volume using storage media of the plurality of storage media; and
   a key rotation initiator module, wherein the key rotation initiator module initializes a target storage media of the plurality of storage media with a new key, couples the target storage media to the host and configures the target storage media as a second mirror storage media in the mirrored volume, performs a mirror revive operation from the first storage media to the target storage media to perform key rotation while the second storage media provides service requests to the host during the mirror revive, wherein the mirror revive operation is optimized using one or more of a data block map optimization or a high water mark optimization, configures the second storage media as a new primary storage media and configures the target storage media as a new mirror storage media to comprise the mirrored volume and configures the first storage media as a new spare storage media and uncouples the first storage media from the host, wherein the new spare storage media includes at least data stored in the first storage media.

6. The computing environment of claim 5 wherein the first and target storage media comprise the mirrored volume before the mirror revive operation.

7. The computing environment of claim 5 wherein the memory of the host further includes a key policy management module for implementing a key rotation policy.

8. The computing environment of claim 5 and further comprising:
   a key manager, the key manager including:
   a key manager server module for providing keys used to access the first and target storage media; and
   a key table that stores and associates key names with keys.

* * * * *